US008705971B2

(12) United States Patent
Skoog et al.

(10) Patent No.: US 8,705,971 B2
(45) Date of Patent: Apr. 22, 2014

(54) THREE-WAY HANDSHAKE (3WHS) OPTICAL NETWORK SIGNALING PROTOCOL

(75) Inventors: Ronald A. Skoog, Bend, OR (US); Arnold Neidhardt, Middletown, NJ (US); Brian Wilson, Rumson, NJ (US)

(73) Assignee: TT Government Solutions, Inc., Basking Ridge, NJ (US)

( * ) Notice: Subject to any disclaimer, the term of this patent is extended or adjusted under 35 U.S.C. 154(b) by 449 days.

(21) Appl. No.: 12/557,335

(22) Filed: Sep. 10, 2009

(65) Prior Publication Data

US 2010/0074623 A1 Mar. 25, 2010

Related U.S. Application Data

(60) Provisional application No. 61/095,749, filed on Sep. 10, 2008.

(51) Int. Cl.
*H04J 14/02* (2006.01)
(52) U.S. Cl.
USPC .............. 398/79; 398/57; 398/55; 398/43; 398/45; 705/400
(58) Field of Classification Search
USPC ................. 398/43, 45, 55, 57; 705/400
See application file for complete search history.

(56) References Cited

U.S. PATENT DOCUMENTS

| 7,218,851 | B1 | 5/2007 | Zang | |
| 2004/0220886 | A1* | 11/2004 | Kumaran et al. | 705/400 |
| 2007/0201871 | A1* | 8/2007 | Peddanarappagari et al. | 398/57 |

FOREIGN PATENT DOCUMENTS

EP 1134922 A2 9/2001

OTHER PUBLICATIONS

Assi ["Control and Management Protocols for Survivable Optical Mesh Networks" Journal of Lightwave Technology col. 21 No. 11 Nov. 2003].*
International Search Report dated Nov. 5, 2009.
Berger, L., "Generalized Multi-Protocol Label Switching (GMPLS) Signaling Functional Description," RFC 3471, Jan. 2003.
Assi, C., et al., "Control and Management Protocols for Survivable Optical Mesh Networks", IEEE Journal of Lightwave Technology, 2003.
Munoz, R., et al., "An experimental signaling enhancement to efficiently encompass WCC and backup sharing in GMPLS-enabled wavelength-routed networks," International Conference on Communications, Beijing, May 2008.

(Continued)

*Primary Examiner* — Oommen Jacob
(74) *Attorney, Agent, or Firm* — Heslin Rothenberg Farley & Mesiti P.C.

(57) ABSTRACT

A method for optical network signaling processing of a signal from a first node to an end node through intermediate nodes is presented. The method comprises determining, in a first pass from the first node to the end node, available wavelengths and wavelength conversion at each node, the end node optimizing the available wavelengths using the available wavelengths and wavelength conversions, at each node, dropping a cross-connect command, in a second pass from the end node to the first node, choosing wavelengths for connection based on the optimizing step, in a third pass from the first node to the end node, receiving at each node a signal message and releasing unused cross-connect commands, the end node identifying the chosen wavelengths and releasing the unused resources, and transmitting the signal on the chosen wavelengths. Restoration paths can also be determined. Optimizing can include selecting and marking one or more backup wavelengths.

14 Claims, 6 Drawing Sheets

(56) References Cited

OTHER PUBLICATIONS

Andriolli, N., et al., "Signaling protocol extensions for converter-saving wavelength assignment in GMPLS optical networks," IEEE High Performance Switching and Routing (HPSR) Workshop, 2006.

Berger, L., GMPLS Signaling Resource ReserVation Protocol—Traffic Engineering (RSVP-TE), http://www.ietf.org/rfc/rfc3473.txt, Jan. 2003.

International Search Report dated Nov. 5, 2009, 2 pages.

* cited by examiner

THREE-WAY HANDSHAKE (3WHS) OPTICAL NETWORK SIGNALING PROTOCOL

CROSS REFERENCE TO RELATED APPLICATIONS

The present invention claims the benefit of U.S. provisional patent application 61/095,749 filed Sep. 10, 2008, the entire contents and disclosure of which are incorporated herein by reference as if fully set forth herein.

FIELD OF THE INVENTION

The present invention relates generally to dynamic optical networks.

BACKGROUND OF THE INVENTION

A Wavelength Division Multiplex (WDM) optical network consists of optical switches, fiber connecting the optical switches, and WDM technology used to carry multiple wavelengths (optical channels) in a fiber. The optical switches are either Reconfigurable Optical Add-Drop Multiplexers (ROADMs) or Optical Cross Connects (OXCs). ROADMs can be viewed as small OXCs, i.e., they connect to a small number of fibers. ROADMs and OXCs have add/drop ports that connect to client ports, and optical connections between client add/drop ports are set up through the ROADM and OXC optical switching fabrics.

In WDM optical networks, an optical connection is set up through multiple fibers. A basic connection consists of a single wavelength channel, and it is desirable for the frequency of the wavelength channel to be the same frequency in each fiber the connection goes through. If a different frequency is used in adjacent fibers, a wavelength converter is required, which increases cost. The ROADMs and OXCs cross-connect the wavelength used by the connection from one fiber to the other. In order for a single wavelength to be used end-end for a connection, there must be a fiber path between the connection end points that has that wavelength available on each fiber in the path, i.e., it is not being used for another connection on any of the fibers along the fiber path. This is known as the "Wavelength Continuity Constraint" (WCC).

If a single wavelength is not available in each fiber along a fiber path, the connection can be established using wavelength conversion connecting two fibers that require different wavelengths within the ROADMs or OXCs. It is desirable to minimize the amount of wavelength conversion required, since the wavelength conversion is done with expensive opto-electronic equipment. Thus, an important part of setting up optical connections is having information available to be able to determine what wavelengths are available in the different fibers and what OXCs and/or ROADMs have available wavelength converters. With this information, end-end optical connections can be established.

In addition to meeting the WCC and minimizing the amount of wavelength conversion that is required, it is necessary to size the network, e.g., number of wavelengths per fiber and number of fibers between OXC and/or ROADMs, to meet blocking requirements for on-demand services. Typical blocking requirements are on the order of $10^{}-2$ to $10^{}-3$.

Another aspect of setting up optical connections is that some services provide restoration after a failure; such as a fiber cut, causes the working channel to fail.

Dynamic and/or WDM optical networks require optical connections meeting the Wavelength Continuity Constraint (WCC) and minimizing the amount of wavelength conversion required when the WCC cannot be met. Further, setting up connections very quickly, e.g., ranging from 100 ms to a few seconds, is desirable. Previous methods to perform these tasks have been based on the work done by the Internet Engineering Task Force (IETF) in their Generalized Multi-Protocol Label Switching (GMPLS) standards, and in particular RFC 3471, which gives the GMPLS signaling functional description, and RFC 3473, which defines the Resource Reservation Protocol-Traffic Engineering (RSVP-TB) signaling procedures.

Probing techniques have been used to collect recent information on available resources. However, there is a relatively high likelihood that the resources identified by the probes as being available may actually not be available when the reservation request arrives. GMPLS-like methods need to do distributed processing with the RESERVE message, which means processing at a number of nodes along the connection setup path.

The prior art (GMPLS) was fixated on more distributed processing methods between Node A and Node Z, where information is passed, usually in a PATH message, from one node to the next, and processing is done along the way so that when the PATH message reaches Node Z, the wavelength to use to the first upstream node can be determined. Subsequent decisions of wavelengths and wavelength conversion are then made at each node along the RESERVE message path from Node Z to Node A. This distributed processing paradigm results in slow connection setup times, and sub-optimal decisions are made. However, it has been the preferred paradigm to use, and this has been strongly influenced by the work in the IETF.

GMPLS methods probe only a single working path, which is usually determined by link-state update information. Link-state update information occurs on a relatively slow time scale, so there is a reasonable probability there are other paths that are more optimal. The GMPLS methods choose working and restoration paths based on slower link-state advertisements that provide summary information on link state.

One of the means that has been considered to distribute information about available wavelength on fiber links is using the IETF extensions to (Open Shortest-Path First Interior Gateway Protocol) OSPF to support GMPLS, which are provided in RFC 4203. The difficulty with these techniques is that the OSPF link state updates cannot be sent out too frequently, so the information becomes stale very quickly in very dynamic networks. A method to get more up-to-date link state information for wavelength services is defined in RFC 3473 which defines a Label Set Object. This Label Set Object collects more current information than GMPLS link state updates can provide, but in dynamic networks its information is still somewhat stale.

There are three major deficiencies in previous methods. One deficiency is that the information the methods use, e.g., the Label Set Object, to collect available resource infatuation, for example available wavelengths in each fiber, leads to stale and incomplete information at the end node that uses the information to choose the wavelength to use for the connection. As a result, there is a non-negligible probability the chosen wavelengths will not be available along the entire selected path when the reservation step of the procedure is executed. Information is incomplete because the Label Set Object only provides Node Z with available wavelength information beyond the last node on the path that does wavelength conversion, and it provides no information on available wavelength converters at the nodes along the signaled path.

The second major deficiency in previous methods is that they do a poor job of optimizing, e.g., minimizing, the number of wavelength converters required to set up a connection. One proposed improvement is called a "Suggested Vector" which does provide significant improvement in the consideration of wavelength conversion. However, the Suggested Vector does not consider the number of available wavelength converters in individual nodes, limiting its optimization capabilities.

The third major deficiency is the inability of the previous methods to set up connections in a very short amount of time, e.g., within 100 ms in the Continental US. The previous methods, GMPLS and extensions based on GMPLS, need to store information like label sets, suggested labels, suggested vectors, etc., in each node along the path. This is because the end node (Z end) does not have enough information to determine what wavelengths are to be used on each link and where wavelength conversion is to be done. The Z end just knows which wavelength to use on the hop to the first up-stream node. The subsequent wavelength and wavelength conversion decisions at the upstream nodes are determined from the previously stored information from the downstream (A to Z) PATH message. This means that when the RESERVE message goes from Node Z to Node A to set up the connection, there must be logical processing to determine what needs to be done at each node. This requires significant processing time, and thus results in relatively slow connection setup times.

A procedure is needed that does the logical processing only once (at Node Z), and on the signaling pass from Node Z to Node A (Pass 2) very simple cross-connect and wavelength conversion commands can be given to the switches, enabling very fast signaling propagation times between Nodes A and Z.

SUMMARY OF THE INVENTION

An inventive method for signaling protocol that can compensate for stale information, set up optical connections very quickly, and achieve low blocking probability and efficient resource (wavelengths, wavelength converters) usage is presented. The inventive procedure is advantageous in terms of the amount of capacity (wavelengths per fiber) that is needed to meet blocking requirements. Also, the inventive procedure allows for much faster signaling speeds, and it enables the optimization of the use of wavelength converters. Further, extra or backup connections are reserved, which significantly reduces the probability of blockage with a negligible impact on increased resource usage.

The inventive system and method allows a consideration of the number of available wavelength converters in the nodes. That is, the consideration of where to do wavelength conversion to include the current availability of wavelength converters along the connection path is enabled. This can have a significant effect on blocking performance. For example, if one node has very few wavelength converters left and another has many more available, and if the connection being set up can be made by doing wavelength conversion at either node, it is highly desirable to do the wavelength conversion at the node having the larger number of converters. This leaves more wavelength converters at the node with only a few left, and thus it reduces the likelihood that that node will run out and subsequently cause blocked calls due to the inability to do wavelength conversion at that node. The invention can make these kinds of assessments, and previous procedures cannot.

The inventive system and method can also include a type of restoration, called "Shared Mesh Restoration", in which a restoration path that is diverse from the working path is determined as part of the connection provisioning process. The restoration paths are only set up after a failure occurs, so if two working connections do not share any failure nodes, they can both "share" the same restoration resources. Thus, for provisioning connections using shared mesh restoration, it is important to be able to identify what wavelengths on different fibers can be shared for restoration.

The inventive method does simple gathering of information from the nodes and does all the significant logical processing at the end nodes (Nodes Z and A). In the past such solutions were avoided because of the limited processing capabilities available, but today there is significant processing available on very small chips, and the arguments for the more distributed processing approach are no longer valid.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION

An inventive method for signaling protocol that can compensate for stale information, set up optical connections very quickly, and achieve low blocking probability by having alternate paths, and efficient resource, e.g., wavelengths, wavelength converters, usage by holding paths for the shortest time and minimizing use of wavelength converters is presented. The signaling protocol process of the present invention is one which probes for available wavelengths as part of the circuit setup process. This signaling protocol efficiently gathers the information needed to set up working and shared mesh restoration paths in a manner that allows very fast circuit setup times, e.g., 100 ms.

As an example case, assume that connections requiring 1, 2, 4 or 8 wavelength channels can be requested. The paths to probe can be determined from GMPLS link state information providing aggregate available capacity on the fiber links. The aggregate spare capacity changes very slowly in accordance with the changes in aggregate traffic intensity, so this link state information becomes stale on a much longer timescale, e.g., minutes, and therefore requires much less frequent updates.

Figure 1:
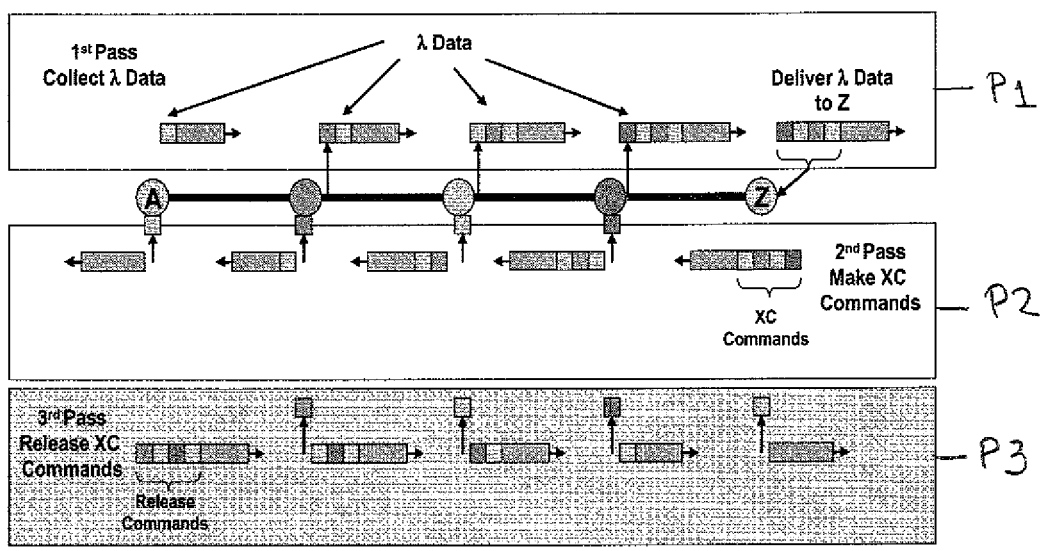
FIG. 1 illustrates the flow of the inventive method.

The concept of the inventive signaling protocol is illustrated in FIG. 1 for a single fiber path. Note that multiple fiber paths (not shown) could be probed simultaneously. The first signaling pass P1 (Node A to Node Z) collects data ($\lambda$ data and wavelength converter data) from each optical switch, e.g., OXC, OADM, along the fiber path, giving the available wavelengths in each fiber pair and the available wavelength conversion resources. When the signaling message arrives at Node Z, that end node can determine very quickly which wavelengths are available along the entire fiber path. Z then picks the number of wavelengths required for the connection (1, 2, 4, or 8) from the available wavelengths, and identifies these as preferred. It also picks a small number of additional (backup) wavelengths, discussed below, from the available wavelengths to allow for contention with other connections to occur without those contentions causing blocking.

Node Z then initiates its local cross-connect commands or cross-connects, described below, from the add/drop ports to the selected wavelengths, and also initiates the second signaling pass P2 (Z to A). The wavelengths chosen would be in accordance with a wavelength assignment (WA) strategy such as First Fit. If a continuous wavelength is not available, wavelength conversion will be used; Node Z will identify the wavelength conversion nodes and the wavelengths to use in the all-optical segments. Note that the number of backup wavelengths might be one or two for single wavelength connections, and for multi-wavelength connections, it could be more.

In the second signaling pass P2 (Z to A) the signaling message drops cross-connects, and wavelength conversion information if needed, at each intermediate node to cross-connect the selected wavelengths, both the preferred and backup. The signaling message does not wait for the cross-connect to complete, it keeps going. The signaling node does check if the required wavelengths are still available and marks connections that try to use unavailable resources as failed. When the signaling message arrives at Node A, it chooses a set of the successful wavelengths for the connection. Note that if the preferred wavelengths are successful, then they are chosen.

Node A initiates the third signaling pass P3 back to Z, and Node A initiates its cross-connect from the add/drop ports to the chosen wavelengths. When those connections to the add/drop ports at Node A are complete, the client at Node A can begin to send data.

In the third signaling pass P3 (A to Z), when the signaling message is received by the intermediate nodes, the cross-connects for the unused wavelengths are released. When the third pass signaling message arrives at Node Z, it identifies the chosen wavelengths and releases the unused wavelengths.

The collection of link state information in the first signaling pass is done using a very fast write by the node element (NE) into the signaling packet, e.g., a vector of 0s and 1s could be written for each fiber-pair into the signaling message; with 0 representing wavelength unavailability on that fiber-pair. The signaling packets might travel on a signaling network that uses a dedicated signaling Optical Supervisory Channel (OSC) in each fiber and a dedicated signaling packet switch capability in each NE. Thus, this write process can be done very fast at near hardware speeds (e.g., <0.1 ms).

A cross-connect is an optical switch configuration where a signal from a specific wavelength on one port, e.g., the A end, is delivered to a specific wavelength on another port, e.g., the Z end, possibly using wavelength conversion resources. A cross-connect command tells the optical switch to setup one or more cross-connects. That is, some switches may allow multiple cross-connects to be configured with a single command while others may not. The present invention is not limited to this cross-connect which is described merely for exemplary purposes.

When shared mesh restoration is used, the inventive procedure is enhanced to also probe the candidate restoration paths to then select restoration as well as working paths and wavelengths. The basic model is that wavelengths in a fiber link are in one of the following states: unreserved, e.g., idle, in-service, or shared-reserved, i.e., shared by multiple restoration paths. It can be assumed that there is a path computation process that determines candidate pairs of working and restoration paths. That is, working paths are computed for each A-Z node pair, and for each working path there are one or more candidate restoration paths computed. The restoration paths must be disjoint from the working path, but the candidate restoration paths for a particular working path do not need to be disjoint.

When a connection request arrives, the inventive method is used to probe with Pass 1 messages one or more candidate working paths for available (unreserved) wavelengths and wavelength converters. At the same time, the restoration paths are probed to identify wavelengths in the unreserved and shared reserved state that can be used to protect the working path. Also Pass 1 P1 probes collect information on wavelength converters along the restoration paths. Since the working and restoration paths are pre-computed, the nodes along the restoration paths can be provisioned with the Shared Risk Link Groups (SRLGs) of each working path the node is supporting. An SRLG identifies an entity that can fail, such as a fiber, node, conduit, tunnel, bridge, etc. When a restoration path is established, the wavelengths in the restoration path are put in the shared reserve state and the SRLGs the restoration path is protecting are stored locally.

When a Pass 1 message goes along a restoration path, the message picks up those wavelengths in the shared reserve state that are not currently protecting the SRLGs of the working path. Note, as described above, the working path SRLGs are available locally along the restoration path. The Pass 1 message also picks up the wavelengths in the unreserved state and wavelength converter availability information. On the working paths, the Pass 1 messages operate as described above. When the working and backup path Pass 1 messages all arrive at Node Z, an algorithm is run to select the best working/backup pair for the connection request. For the choice of restoration paths, the main objective is to maximize sharing, so it is desired to maximize the number of wavelengths in the shared reserved state. Other metrics can also be used, such as number of working paths being protected by wavelengths in the shared reserve state. The use of wavelength converters is also optimized.

On Pass 2 P2, extra resources can be reserved on both the working and backup paths to reduce the probability of blocking from contention with other connections being set up. Node A would make the final selection of working/restoration paths and Pass 3 messages would release the unused Pass 2 P2 reservations.

An advantage of this inventive procedure is that on Pass 2 P2 (Node Z to Node A), extra channels are reserved to protect against getting blocked from resources, identified as idle when Node Z made its selection, becoming busy. Analysis using a requirement of $10^{**}-3$ blocking probability shows that the previous procedures without reserving extra resources on Pass 2 P2 would require approximately five times as many wavelengths in each fiber as the inventive method requires. Moreover, reserving extra resources on Pass 2 P2 increases resource usage by only about one percent.

As discussed above, the inventive process does very simple data collection on Pass 1 P1, and very simple commands on Pass 2 P2 and Pass 3 P3. All of the logical processing affecting setup time is done once at Node Z after Pass 1 P1. As a result, very fast connection setup times are possible. Previous methods do logical processing at each switch for both Pass 1 (the A to Z PATH message) and Pass 2 (the Z to A RESERVE message). This results in much slower signaling propagation times.

In the setup of shared mesh restoration paths, the inventive procedure does not require collecting SRLG information in the signaling probes. Due to pre-provisioning the working path SRLGs in the nodes of the working path's restoration paths, the Pass 1 probes on restoration paths only pick up shared reserve wavelengths that do not protect SRLGs of the working path. Previous procedures have to collect SRLG information and process that information at Node Z. Hence the inventive methodology enables signaling processing to be much simpler and quicker than that done with other methods.

The extra channels reserved on Pass 2 P2 make a significant difference (reduction) in the blocking probability without consuming significant excess resource usage. The concept of, on Pass 2, reserving more resources than needed for the requested connection is a strategy that has a very high payoff without a significant cost penalty in increased resource usage since these resources are only reserved for a short time (a few milliseconds).

Figure 2:
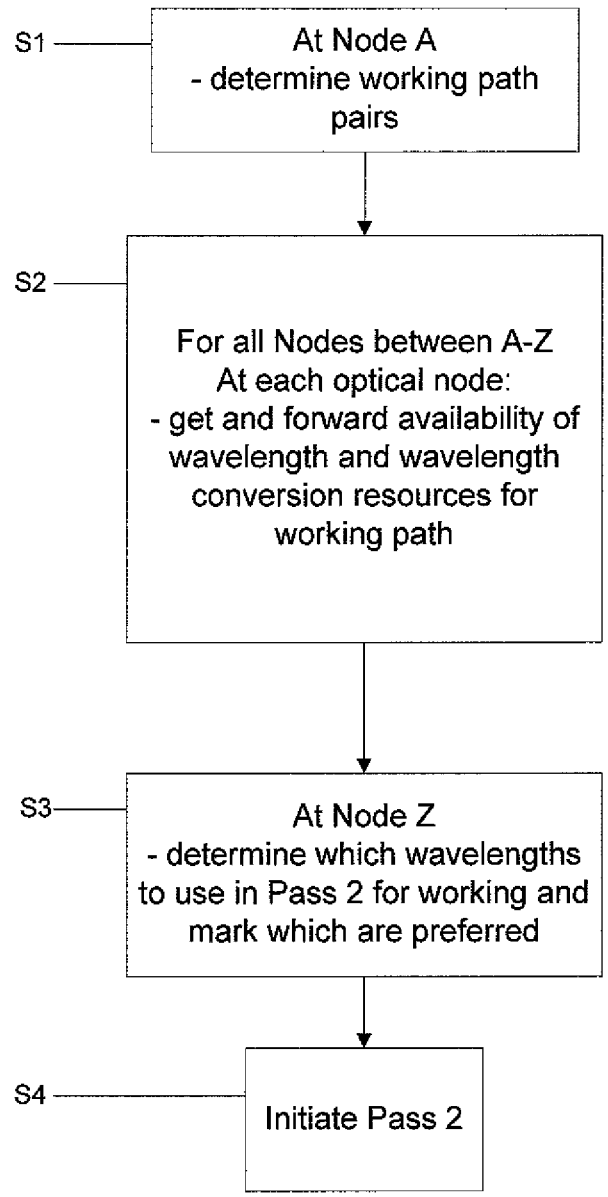
FIG. 2 is a flow diagram of a first path in a first embodiment.

FIG. 2 is a flow diagram of the first pass of the inventive method. The pass P1 begins at step S1 with Node A. At step S1, Node A determines working path pairs, and launches the pass 1 messages. At step S2, for nodes between A-Z, e.g., intermediate nodes, at each optical switch or node, the availability of wavelength and wavelength conversion resources are obtained, that is, the working path pairs from Node A are modified to incorporate the availability of resources. Accordingly, each intermediate node forwards just one message for each working path or candidate pair that passes through that node. In other words, step S2 is performed once for Node B (first node connected to node A), and for the next connected node, and for all nodes until Node Z. Note that each working path being explored by Node A has one or more intermediate nodes, with relevant intermediate nodes being those on the working path(s). At Node Z, optimization is performed in step S3, that is, the wavelengths to use in Pass 2 P2 for working path pairs are determined and marked as preferred. In step S4, Node Z initiates pass 2 P2.

Figure 3:
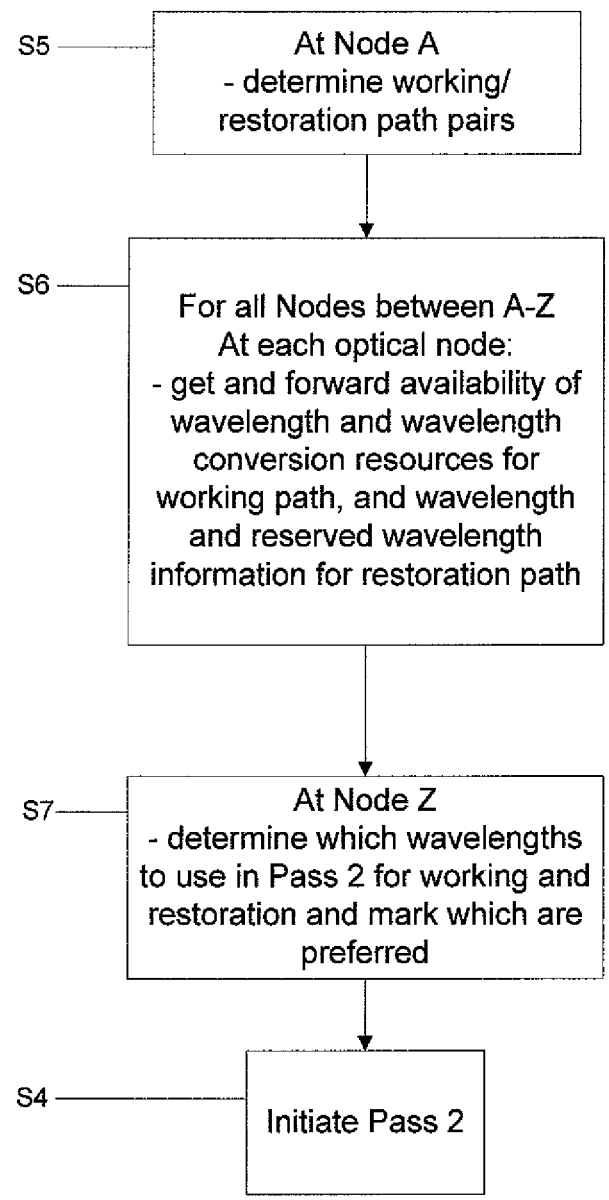
FIG. 3 is a flow diagram of a first path in a second embodiment.

FIG. 3 is flow diagram of the first pass of the inventive method in accordance with an embodiment incorporating restoration paths in the inventive procedure. In Step S5, Node A determines both working and restoration path pairs, and launches the pass 1 messages. At step S6, for nodes between A-Z, at each node, the availability of wavelength and wavelength conversion resources for working path and for restoration path are obtained and forwarded. Each intermediate node forwards just one message for each path pair, e.g., working and/or restoration, that passes through the node. At step S7, Node Z determines which wavelengths to use in Pass 2 for working and for restoration, and these wavelengths are marked as preferred. Step S4 initiates Pass 2 P2 as in FIG. 2.

Figure 4:
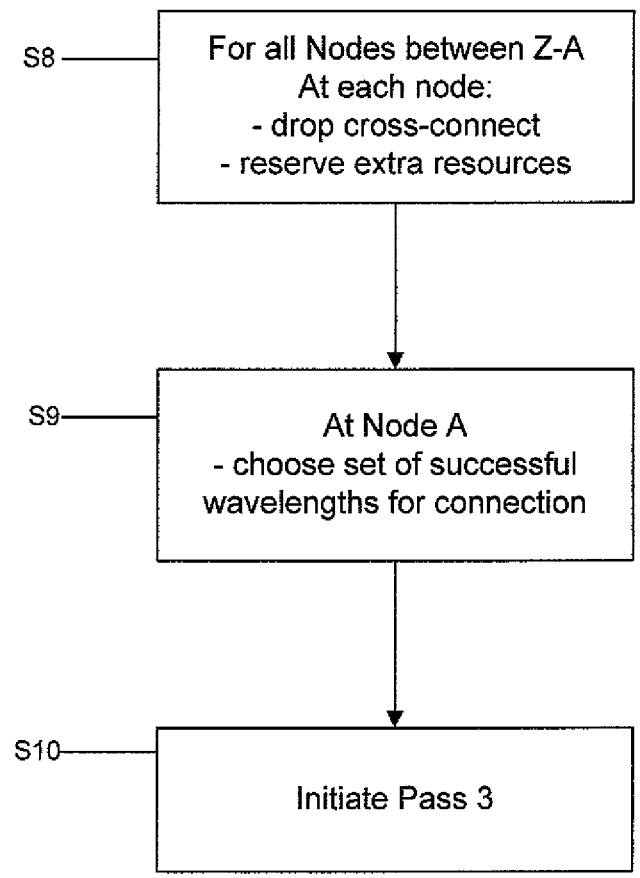
FIG. 4 is a flow diagram of a second path in the first embodiment.

FIG. 4 is a flow diagram of the second pass P2. The pass P2 begins at step S8 as follows. At step S8, for nodes Z-A, at each node, a drop of the cross-connect command is performed and extra resources are reserved. At step S9, at Node A, the set of successful wavelengths for connection are chosen. In step S10, Node A initiates pass 3 P3.

Figure 5:
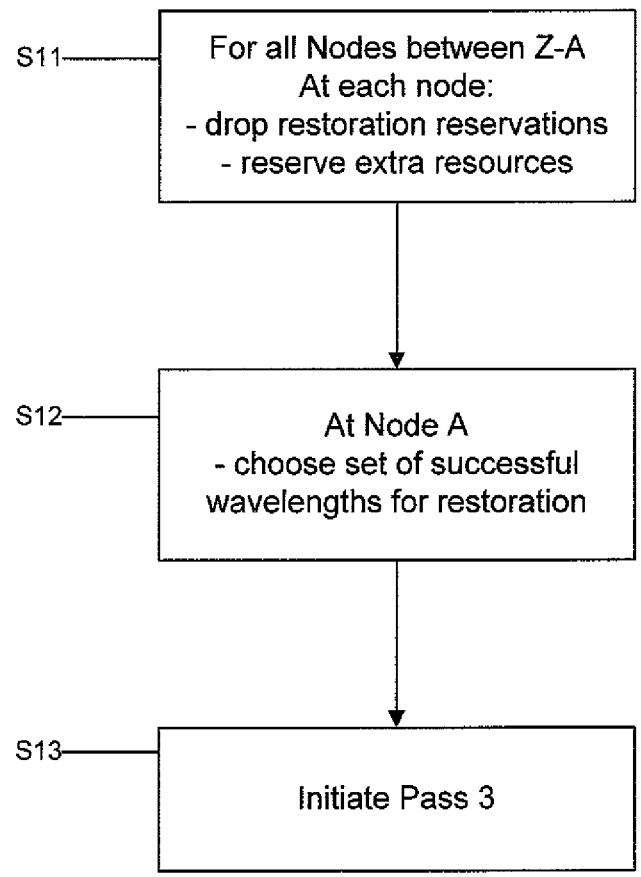
FIG. 5 is a flow diagram of a second path in the second embodiment.

FIG. 5 is a flow diagram of the second pass P2 in the embodiment including restoration paths. In this embodiment, both the steps shown in FIG. 4 and those shown in FIG. 5 are performed. The pass P2 begins at step S11 as follows, and can be performed before, after, or in conjunction with steps S8 and S9. At step S11, for, nodes Z-A, at each node, a drop of the restoration reservations is performed and extra resources are reserved. At step S12, at Node A, the set of successful wavelengths for connection are chosen. In step S13, Node A initiates pass 3 P3.

Figure 6:
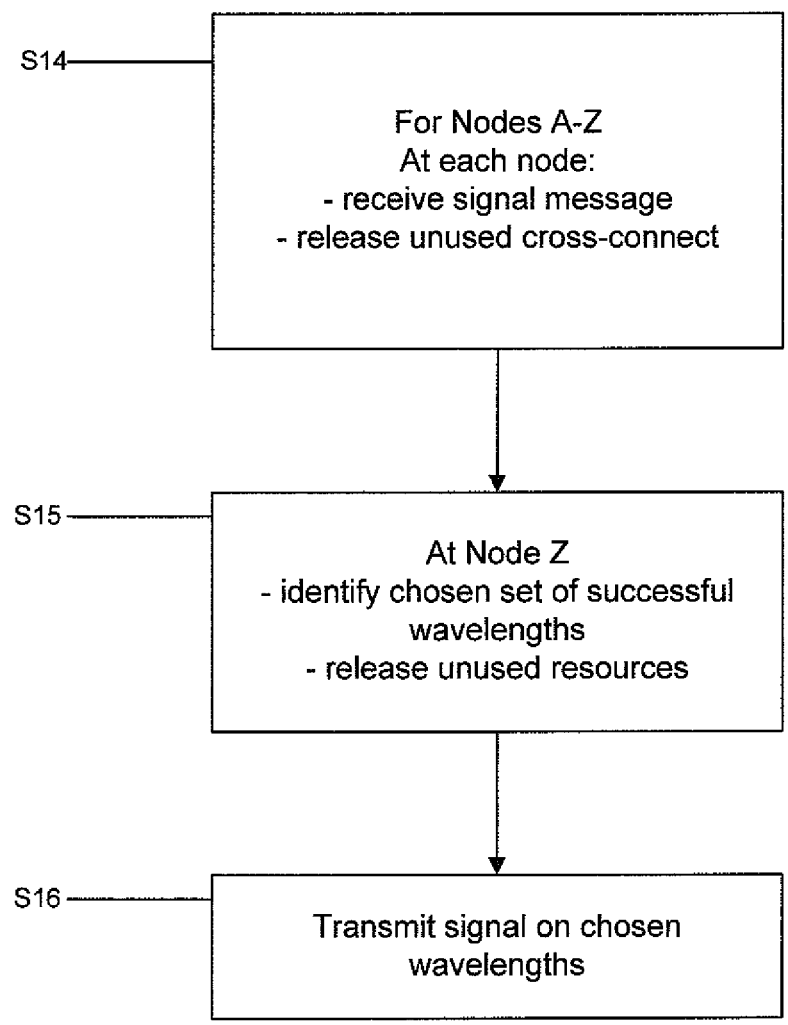
FIG. 6 is a flow diagram of a third path of the inventive method.

FIG. 6 is a flow diagram of the third pass P3. The pass P3 begins at step S14 with Node A. At step S14, for nodes A-Z, at each node, the signal message is received and unused cross-connect resources are released. At step S15, at Node Z, the chosen wavelength is identified and any remaining unused resources are released. At step S16, the signal is transmitted along the chosen wavelengths and wavelength conversions.

An example of the inventive procedure follows. One measure of the efficiency of a signaling and wavelength selection protocol is the number of wavelengths required on the fiber links to achieve a specified blocking probability. Given a 3-hop fiber path between Nodes A and Z, and an aggregate load (from all paths) on each fiber link to be a 10 Erlang load. Consider how many wavelengths would be required on a fiber to achieve a 10-3 blocking on the 3-hop path. As a baseline for comparison, use the perfect case of zero propagation and processing delays and complete information on available wavelengths. In that case, 28 wavelengths are required to achieve 10-3 blocking probability.

If the round-trip propagation time were to be 0.01 times the mean call holding time, then if no extra wavelengths are reserved on Pass 2 P2, 161 wavelengths are required to achieve 10-3 blocking probability. However, if a single extra wavelength is reserved on Pass 2 P2, 28 wavelengths are required, just as in the ideal, zero propagation delay, case. With the extra wavelength being reserved on Pass 2 P2, the average link load becomes 10.1. Erlang, so the inventive procedure increases the load by just one percent.

Other experimental results similarly show that the inventive method needs just one or two extra wavelengths on Pass 2 to achieve the same performance as the ideal, zero propagation delay, case. We also note that RSVP-TE signaling techniques using the IETF standardized Shared Label set to identify available wavelengths would require the 161 wavelengths rather than the 28 required by the present invention.

A simulation study was done to compare the inventive procedure with the standardized GMPLS signaling methods in terms of the use of wavelength converters. It was shown that the GMPLS methods require 74% more wavelength converters. Further, the present invention advantageously considers the number of available wavelength converters in individual nodes, whereas prior techniques, including the "suggested vector" technique discussed above, do not.

Accordingly, advantages of the present invention include the following. A powerful new signaling protocol procedure for dynamic optical networks is provided. The procedure enables very fast setup time, low backward blocking and efficient restoration. The inventive computation model is not distributed, instead it collects all required information and then computes optimal solution in one operation. The inventive technique has explicit (adaptive) control over backwards blocking by the selection of the number of extra channels that are reserved on Pass 2 P2. Multiple paths are probed, enabling the best working path to be chosen based on current, detailed information. Based on current network state, both working and restoration paths can be chosen at the same time. In addition, all optical segments can be maximized and wavelength conversions can be minimized.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method comprising:
    determining, in a first pass from a first node to an end node, available wavelengths and available wavelength conversion resources at each node of one or more intermediate nodes;
    optimizing a selection of a preferred path and a backup path, by the end node in the first pass from the first node to the end node, in accordance with the available wavelengths and wavelength conversion resources, the backup path maximizing sharing;
    dropping, in a second pass from the end node to the first node, a cross-connect command at each node of the one or more intermediate nodes;
    marking a wavelength as failed in the second pass from the end node to the first node;
    selecting, by the first node, in the second pass from the end node to the first node, wavelengths for connection based on the optimizing and based on the marked failed wavelength;
    receiving, in a third pass from the first node to the end node, a signal message and releasing unused cross-connect commands at the first node and each of the one or more intermediate nodes;
    identifying by the end node, in the third pass from the first node to the end node, the selected wavelengths and releasing unused resources; and
    transmitting a signal on the selected wavelengths.

2. The method according to claim 1, the optimizing comprising:
    determining by the end node, in the first pass from the end node to the first node, a number of wavelengths and marking the determined wavelengths as preferred; and
    selecting and marking by the end node, in the first pass from the first node to the end node, one or more backup wavelengths.

3. The method according to claim 2, wherein the wavelengths selected are the determined wavelengths marked as preferred.

4. The method according to claim 1, further comprising determining, in the first pass from the first node to the end node, restoration wavelengths.

5. The method according to claim 4, wherein determining further comprises:
    establishing at the first node the available wavelengths and available wavelength conversion resources and available restoration paths;
    getting and forwarding, at each node of the one or more intermediate nodes, the available wavelengths and the available wavelength conversion resources; and
    getting and forwarding, at each node of the one or more intermediate nodes, the available restoration paths.

6. The method according to claim 1, wherein determining further comprises:
    establishing at the first node the available wavelengths and available wavelength conversion resources; and
    getting and forwarding, at each node of the one or more intermediate nodes, the available wavelengths and the available wavelength conversion resources.

7. The method according to claim 1, wherein the end node initializes the second pass and the first node initializes the third pass.

8. A non-transitory computer readable storage medium having computer readable program for operating on a computer for optical network signaling processing of a signal from a first node to an end node through one or more intermediate nodes, the program comprising instructions that cause the computer to execute operations comprising:
    determining, in a first pass from the first node to the end node, available wavelengths and available wavelength conversion resources at each node of the one or more intermediate nodes;
    optimizing a selection of a preferred path and a backup path, by the end node in the first pass from the first node to the end node, in accordance with the available wavelengths and wavelength conversion resources, the backup path maximizing sharing;
    dropping, in a second pass from the end node to the first node, a cross-connect command at each node of the one or more intermediate nodes;
    marking a wavelength as failed in the second pass from the end node to the first node;
    selecting, by the first node, in the second pass from the end node to the first node, wavelengths for connection based on the optimizing and based on the marked failed wavelength;
    receiving, in a third pass from the first node to the end node, a signal message and releasing unused cross-connect commands at the first node and each of the one or more intermediate nodes;
    identifying by the end node, in the third pass from the first node to the end node, the selected wavelengths and releasing unused resources; and
    transmitting a signal on the selected wavelengths.

9. The non-transitory computer readable storage medium according to claim 8, wherein optimizing comprising:
    determining by the end node, in the first pass from the end node to the first node, a number of wavelengths and marking the determined wavelengths as preferred; and selecting and marking by the end node, in the first pass from the first node to the end node, one or more backup wavelengths.

10. The non-transitory computer readable storage medium according to claim 9, wherein the wavelengths selected are the determined wavelengths marked as preferred.

11. The non-transitory computer readable storage medium according to claim 8, further comprising determining, in the first pass from the first node to the end node, restoration wavelengths.

12. The non-transitory computer readable storage medium according to claim 11, wherein determining further comprises:
   establishing at the first node the available wavelengths and available wavelength conversion resources and available restoration paths;
   getting and forwarding, at each node of the one or more intermediate nodes, the available wavelengths and the available wavelength conversion resources; and
   getting and forwarding, at each node of the one or more intermediate nodes, the available restoration paths.

13. The non-transitory computer readable storage medium according to claim 8, wherein determining further comprises:
   establishing at the first node the available wavelengths and available wavelength conversion resources; and
   getting and forwarding, at each node of the one or more intermediate nodes, the available wavelengths and the available wavelength conversion resources.

14. The non-transitory computer readable storage medium according to claim 8, wherein the end node initializes the second pass and the first node initializes the third pass.

* * * * *

UNITED STATES PATENT AND TRADEMARK OFFICE
CERTIFICATE OF CORRECTION

| | | |
|---|---|---|
| PATENT NO. | : 8,705,971 B2 | Page 1 of 1 |
| APPLICATION NO. | : 12/557335 | |
| DATED | : April 22, 2014 | |
| INVENTOR(S) | : Skoog et al. | |

It is certified that error appears in the above-identified patent and that said Letters Patent is hereby corrected as shown below:

In the Specification

Column 1, Line 11 insert the following: -- STATEMENT REGARDING FEDERALLY SPONSORED RESEARCH OR DEVELOPMENT The disclosed invention was made with government support under contract No. N00173-08-C-2011 awarded by Navy Research Labs. The government has certain rights in the present invention. --

Signed and Sealed this
Eleventh Day of November, 2014

Michelle K. Lee
*Deputy Director of the United States Patent and Trademark Office*